(12) United States Patent
Giroud et al.

(10) Patent No.: US 9,088,047 B2
(45) Date of Patent: Jul. 21, 2015

(54) ELECTRODE FOR A LITHIUM BATTERY (75) Inventors: Nelly Giroud, Saint Etienne (FR);
Helene Rouault, Le Versoud (FR);
Sebastien Solan, Seyssinet-Pariset (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 165 days.

(21) Appl. No.: 13/812,758

(22) PCT Filed: Jul. 13, 2011

(86) PCT No.: PCT/FR2011/000419
§ 371 (c)(1),
(2), (4) Date: Jan. 28, 2013

(87) PCT Pub. No.: WO2012/013872
PCT Pub. Date: Feb. 2, 2012

(65) Prior Publication Data
US 2013/0126803 A1 May 23, 2013

(30) Foreign Application Priority Data

Jul. 29, 2010 (FR) .................................. 10 03193

(51) Int. Cl.
*H01M 4/58* (2010.01)
*H01M 4/36* (2006.01)
*H01M 10/0525* (2010.01)
*H01M 4/136* (2010.01)
*H01M 4/62* (2006.01)
*H01M 10/052* (2010.01)

(52) U.S. Cl.
CPC ............ *H01M 4/5825* (2013.01); *H01M 4/136* (2013.01); *H01M 4/364* (2013.01); *H01M 4/621* (2013.01); *H01M 4/622* (2013.01); *H01M 4/625* (2013.01); *H01M 10/0525* (2013.01); *H01M 10/052* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2004/0076883 A1* | 4/2004 | Aoshima et al. | 429/223 |
| 2006/0222952 A1* | 10/2006 | Kono et al. | 429/231.95 |
| 2007/0026313 A1 | 2/2007 | Sano | |
| 2007/0092796 A1 | 4/2007 | Matsuda et al. | |

FOREIGN PATENT DOCUMENTS

WO    WO 2009/117869 A1    10/2009

OTHER PUBLICATIONS

Cai et al., "Preparation and performances of LiFePO₄ cathode in aqueous solvent with polyacrylic acid as a binder," *Journal of Power Sources*, 2009, pp. 547-551, vol. 189, published by Elsevier B.V.

* cited by examiner

*Primary Examiner* — Harold Pyon
*Assistant Examiner* — Katie L Hammer
(74) *Attorney, Agent, or Firm* — Oliff PLC (57) ABSTRACT

The invention relates to an electrode for a lithium battery that contains $LiFePO_4$ as electrochemically active material and a binder consisting of polyacrylic acid. The polyacrylic acid has a mean molecular weight greater than or equal to 1,250,000 g·mol$^{-1}$ and strictly less than 2,000,000 g·mol$^{-1}$. The percentage of $LiFePO_4$ is greater than 90% by weight and the percentage of polyacrylic acid is less than or equal to 4%, said percentages being calculated with respect to the total weight of the electrode. The invention further relates to a lithium storage battery having a power or energy operating mode that contains the electrode for a lithium battery.

10 Claims, 3 Drawing Sheets

ELECTRODE FOR A LITHIUM BATTERY

BACKGROUND OF THE INVENTION

The invention relates to an electrode for a lithium battery containing LiFePO$_4$ as electrochemically active material and a binder consisting of polyacrylic acid.

The invention also relates to the use of such an electrode in a lithium battery having a power or energy operating mode.

STATE OF THE ART

Lithium batteries present electrochemical properties that give good performances, in particular in terms of potential and stability of the charge and discharge capacity.

Figure 1:
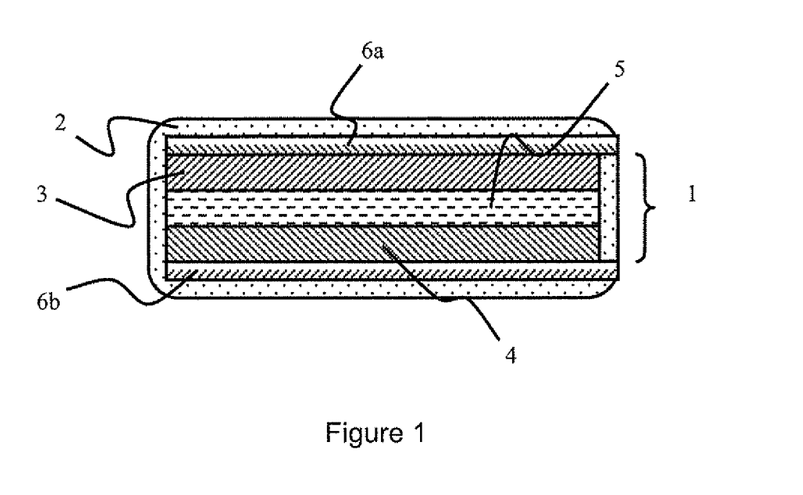
FIG. 1 represents, schematically and in cross-section, a lithium storage battery according to the prior art.

As represented in FIG. 1, lithium storage batteries are conventionally formed by an electrochemical cell 1 or a stack of electrochemical cells 1 in a casing 2. Each electrochemical cell 1 is formed by a negative electrode 3 and a positive electrode 4, separated by an electrolyte 5. Each of the positive and negative electrodes, respectively 3 and 4, is in contact with a current collector, 6a or 6b, which performs transportation of the electrons to an external electric circuit (not shown). Depending on the type of lithium storage battery, electrolyte 1 can be in solid or liquid form, or in the form of a gel.

Electrodes 3 and 4 are generally produced by coating of an ink containing the electrochemically active material on the current collector 6a or 6b. The electrochemically active material is generally dispersed in an organic or aqueous solvent. The coating step is conventionally followed by drying of the ink/collector assembly to remove the solvent contained in the ink. Electrode 3 and 4 obtained in this way adheres to current collector 6a or 6b.

The ink is generally formed by a mixture of the powdery electrochemically active material, a binder and an electronic conductor. The binder ensures the mechanical strength of electrode 3 or 4, and improves the interface between electrode 3 or 4, and electrolyte 5.

The electronic conductor is used to improve the electronic conductivity of electrodes 3 and 4.

The coating thickness defines the grammage of electrode 3 or 4. What is meant by grammage is the weight of electrochemically active material per surface unit. From the specific capacity of the active material constituting the electrode and from the grammage obtained, the surface capacity of the electrode, expressed in mAh·cm$^{-2}$, can be calculated.

Electrode 3 or 4 thus formed is compressed or calendered and then cut in the form of electrode pellets before being assembled in the lithium storage battery, typically a button cell format.

Compression or calendering modifies the porosity of electrode, 3 or 4, and plays a role in particular in the wettability of the electrode with respect to electrolyte 5 and the electronic conduction of electrode 3 or 4.

The composition of the ink, in particular the percentage of electro-chemically active material, changes according to the targeted application.

A distinction is thus made between the electrode formulations for a so-called "power" lithium storage battery and those for a so-called "energy" lithium storage battery.

Power lithium storage batteries can withstand high charge and discharge rates, for example current pulses. In general, these are batteries carrying little capacity and require electrodes of low grammage, with low surface capacities. The electrodes used are thin, i.e. they have a small dry thickness, and present a grammage of about 1 mAh·cm$^{-2}$. The percentage of electrochemically active material is fairly low, generally between 82% and 88%. The percentage of electronic conductor is on the other hand high in order to facilitate transfer of the electrons and to avoid limiting the performances of the lithium storage battery due to a slow charge transfer.

Table (1) sets out below the proportions of the constituents of an electrode of a power lithium storage battery according to the prior art.

TABLE 1

| Electrode constituent | Range in weight percentage (%) |
| --- | --- |
| Electrochemically active material | 80-88 |
| Electronic conductor | 8-10 |
| Polymer binder | 5-10 |

Energy lithium batteries are high-capacity storage batteries which generally operate at charge and discharge rates ranging from C/20 to C in the most extreme cases. They require thick, highly weighted electrodes, with high surface capacities, i.e. greater than or equal to about 2.3 mAh·cm$^{-2}$. The specific capacities for the positive electrodes are advantageously greater than or equal to 4 mAh·cm$^{-2}$, and preferably to 5 mAh·cm$^{-2}$. The percentage of electrochemically active material is high in order to embark a large capacity in the lithium storage battery. The percentage of electrochemically active material is conventionally more than 90% and the percentage of electronic conductor is low.

Table 2 below sets out the proportions of the constituents of an electrode of an energy lithium storage battery according to the prior art.

TABLE 2

| Electrode constituent | Range in weight percentage (%) |
| --- | --- |
| Active material | 90-96 |
| Electronic conductor | 1.5-4 |
| Polymer binder | 2-6 |

For example purposes, table (3) below sets out different formulations of electrodes conventionally used in lithium storage batteries and their corresponding application.

TABLE 3

| Electrode material | Percentage of active material | Percentage of polymer binder | Percentage of electronic conductor | Power/ Energy Application |
| --- | --- | --- | --- | --- |
| C$_{graphite}$ | 96% | 2% | 2% | Energy |
| Li$_4$Ti$_5$O$_{12}$ | 82% | 6% | 12% | Power |
| LiFePO$_4$ | 90% | 6% | 4% | Energy |

The binders commonly used for electrodes at the present time are polymer binders that are soluble in organic solvents such as polyvinylidene fluoride, abbreviated to PVDF. The organic solvent is generally N-methyl-2-pyrrolidone, abbreviated to NMP. Apart from the high cost of PVDF and NMP, the fabrication method of an electrode by organic means presents the disadvantage of using an organic solvent that is combustible, volatile, inflammable and toxic. NMP is in fact classified as a Carcinogenic Mutagenic Reprotoxic (CMR) compound the use of which requires particular handling conditions to be implemented.

Polymer binders soluble in an aqueous solvent have been proposed to remedy the drawbacks of PVDF. In particular, research has been directed towards carboxymethyl cellulose, abbreviated to CMC, nitrile butadiene rubber, abbreviated to NBR, and styrene butadiene rubber, abbreviated to SBR.

More recently, electrodes containing polyacrylic acid (PAA) as binder have been proposed.

In particular, the document US-A-2007026313 proposes using polyacrylic acid in a silicon-based negative electrode in order to remedy the problem of expansion and contraction of the silicon-based electrochemically active material, commonly encountered within the scope of the charge and discharge cycles of a battery containing such an electrode, and responsible in fine for deterioration of the electrochemical performances of said battery.

Furthermore, a negative electrode containing $LiFePO_4$ and polyacrylic acid has also been proposed. The international patent application WO2009/117869 and the article by Cai, Z. P. et al. "Preparation and performances of $LiFePO_4$ cathode in aqueous solvent with polyacrylic acid as binder" (Journal of Power Sources, n°189, (2009), 547-551) can be cited for example purposes. In particular, Cai et al. described $LiFePO_4$ electrodes made from 90% by weight of $LiFePO_4$ coated with carbon (2% by weight) and 10% by weight of polyacrylic acid having a mean molecular weight of 1,000,000 g·mol$^{-1}$. Cai et al. highlighted the improved performances of electrodes prepared from polyacrylic acid compared with those of electrodes prepared with PVDF.

OBJECT OF THE INVENTION

The object of the invention is to provide an electrode for a lithium storage battery having improved electrochemical performances and a good mechanical strength, in particular facilitating the printing of the electrode, with a good definition of the printed pattern.

A further object of the invention is to provide an electrode for a lithium battery that is economically viable and involving materials that are non-polluting and inoffensive for the environment.

According to the invention, the subject is achieved by an electrode for a lithium storage battery and the use of such an electrode according to the appended claims.

In particular, this object is achieved by the fact that the polyacrylic acid has a mean molecular weight greater or equal to 1,250,000 g·mol$^{-1}$ and strictly less than 2,000,000 g·mol$^{-1}$ and by the fact that the weight percentage of $LiFePO_4$ is greater than 90% and the weight percentage of polyacrylic acid is less than or equal to 4%, said percentages being calculated with respect to the total weight of the electrode.

According to a preferred embodiment, the weight percentage of $LiFePO_4$ is greater than 94% and the weight percentage of polyacrylic acid is less than or equal to 3%, said percentages being calculated with respect to the total weight of the electrode.

According to a development of the invention, the weight percentage of polyacrylic acid with respect to the total weight of the electrode is less than 3%.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

An electrode for a lithium storage battery comprises an electrochemically active material and a binder formed by polyacrylic acid.

The polyacrylic acid, abbreviated to PAA, is chosen from polyacrylic acids having a mean molecular weight greater than or equal to 1,250,000 g·mol$^{-1}$ and strictly less than 3,000,000 g·mol$^{-1}$.

The mean molecular weight of the polyacrylic acid is preferably comprised between 1,250,000 g·mol$^{-1}$ and 2,000,000

The polyacrylic acid advantageously has a mean molecular weight greater than or equal to 1,250,000 g·mol$^{-1}$ and strictly less than 2,000,000 g·mol$^{-1}$.

The percentage of electrochemically active material is greater than or equal to 90% by weight with respect to the total weight of the electrode. The percentage of electrochemically active material is moreover less than 100% with respect to the total weight of the electrode on account of the essential presence of the binder.

The electrochemically active material, noted MA, can be a positive electrode material for a Lithium-Ion storage battery, for example an active Li$^+$ lithium ion insertion or intercalation material. The electrochemically active materials can be either non-lithiated materials such as for example copper sulphides or disulphides (Cu or $CuS_2$), tungsten oxysulfides ($WO_yS_z$), titanium disulfides ($TiS_2$), titanium oxysulfides ($TiO_xS_y$) or vanadium oxides ($V_xO_y$) or lithiated materials such as for example lithium-based mixed oxides such as lithium and cobalt oxide ($LiCoO_2$), lithium and nickel oxide ($LiNiO_2$), lithium and manganese oxide ($LiMn_2O_4$), lithium and vanadium pentoxide ($LiV_2O_5$), lithium and iron phosphate ($LiFePO_4$) or lithium, manganese and nickel oxide ($LiNi_{0.5}Mn_{1.5}O_4$).

The electrochemically active material can also be a negative electrode material for a lithium storage battery, for example graphite carbon, noted $C_{gr}$, metallic lithium or a lithium and titanium oxide such as $Li_4Ti_5O_{12}$.

The electrochemically active material is advantageously $LiFePO_4$.

The electrochemically active material can be formed by particles of active material coated by an electrically conducting material, in particular carbon obtained by means of any known method.

According to a first particular embodiment, the weight percentage of electrochemically active material is greater than 90% and the weight percentage of binder is less than or equal to 4%, said percentages being calculated with respect to the total weight of the electrode.

Advantageously, the weight percentage of electrochemically active material is greater than 94% and the weight percentage of binder is less than or equal to 3%, said percentages being calculated with respect to the total weight of the electrode.

The weight percentage of polyacrylic acid with respect to the total weight of the electrode is preferably less than 3%.

An electrode can for example be formed by 90% by weight of electrochemically active material and 10% of binder, the percentage being calculated with respect to the total weight of the electrode.

The electrode is prepared in an aqueous solution according to the fabrication method described in the following.

An ink is initially obtained by mixing the electrochemically active material (MA) and the polyacrylic acid (PAA) in distilled water in a weight percentage ratio (% MA:% PAA) of 90:10.

The binder has the function of ensuring the mechanical strength of the electrode and of improving the interaction between the electrode and the electrolyte of the lithium storage battery.

The ink is then deposited in the form of a layer of variable thickness on a sheet, which is generally a metallic sheet and which constitutes a current collector to form an ink/collector assembly.

For example purposes, a sheet of copper is conventionally used for a graphite carbon, silicon or silicon carbide electrode, and a sheet of aluminium is used for $LiFePO_4$ or $Li_4Ti_5O_{12}$ electrodes. Typically, the negative electrodes are coated or printed on copper collectors and the positive electrodes are coated or printed on aluminium collectors.

Finally, the ink/collector assembly is dried by means of any known method to evaporate the water and obtain an electrode supported on the current collector.

The electrode formed in this way can then be compressed or calendered to improve the cohesion of the electrode and to increase the electronic conductivity of the electrode. Compression or calendering has the effect of moving the particles of electrochemically active material towards one another, thereby improving the electric percolation between the particles of the electrochemically active material of the electrode. Compression or calendering does on the other hand at the same time reduce the porosity of the electrode. The electrode does however have to be sufficiently porous to enable the impregnation of the electrolyte in the electrode. The compression or calendering rate has to be adjusted to obtain an intermediate porosity and prevent obstruction of the pores of the electrode.

The electrode is then cut into the form of electrode pellets by means of any known method and then characterized. For example purposes, electrode pellets are obtained with cutting dies of diverse and varied shapes, for example square or round.

The capacity, in milliamp-hours (mAh), of the electrode pellet is determined according to the weight of the electrochemically active material contained in the pellet, noted $m_{Ma}$.

The weight of the electrochemically active material in the pellet is calculated according to the following equation (1):

$$m_{MA} = (m_{total} - m_{collector}) \times \%MA \quad (1)$$

in which:

$m_{MA}$, $m_{tot}$ and $m_{collector}$ respectively represent the weight of MA, the total weight of the electrode pellet and the weight of the current collector, and % MA represents the weight percentage of MA in the electrode.

The capacity of the pellet, noted $C_{pellet}$ in mAh can then be calculated according to the following equation (2):

$$C_{pellet} = m_{MA} \times C_{MA} \times 1000 \quad (2)$$

in which $C_{MA}$ is the specific capacity of the electrochemically active material in $mAh \cdot g^{-1}$.

The coating thickness also determines the grammage of the electrode which corresponds to the surface capacity expressed in $mAh \cdot cm^{-2}$. The grammage is the ratio of the capacity $C_{MA}$ over the surface of the electrode pellet.

The pellets are then dried in a vacuum at 80° C. for 48 H and then placed in the glove box before being assembled on a lithium storage battery fabricated by means of any known method.

It has been shown that the choice of the mean molecular weight of the polyacrylic acid in the selected range, i.e. a mean molecular weight 1,250,000 $g \cdot mol^{-1}$ and <3,000,000 $g \cdot mol^{-1}$, enables a better mechanical strength to be obtained, in particular enabling a better adhesion of the electrode on the current collector.

Advantageously, within the selected range, the mean molecular weight of the polyacrylic acid is chosen less than 2,500,000 $g \cdot mol^{-1}$, preferably even less than 2,000,000 $g \cdot mol^{-1}$.

An absence of cracking and/or of lift-off of the electrode has also been observed in the selected PAA range. The combination of the selected molecular weight range of the PAA described in the above with the choice of $LiFePO_4$ as electrochemically active material is particularly advantageous. The electrode described above, in particular containing $LiFePO_4$, presents a better homogeneity, flexibility and adhesion to the current collector. Lithium storage batteries comprising at least such an electrode consequently have improved electrochemical performances.

Example

An electrode on an aluminium current collector, noted E1-PAA/90-10, was produced according to the method described above with a 90:10 by weight mixture of $LiFePO_4$ and of a polyacrylic acid having a mean molecular weight of 1,250,000 $g \cdot mol^{-1}$.

$LiFePO_4$ constitutes the electrochemically active material and PAA the binder of the electrode.

The E1-PAA/90-10 electrode is tested directly after drying without a compression or a calendering step.

Comparative examples were also produced under the same conditions with the exception of the mean molecular weight of the PAA. In particular, three comparative electrodes, C1-PAA/90-10, C2-PAA/90-10 and C3-PAA/90-10 were produced from polyacrylic acid having a mean molecular weight respectively of 250,000 $g \cdot mol^{-1}$, 1,000,000 $g \cdot mol^{-1}$ and 3,000,000 $g \cdot mol^{-1}$.

The mechanical properties of the electrodes thus obtained, and in particular their quality of adhesion on the current collector, were evaluated on the basis of characteristics observable with the naked eye. In particular, the quality of the electrode was evaluated on the basis of its flexibility properties, i.e. the ability of the electrode before being cut into pellets to bend without breaking and the presence or absence of lift-off of the electrode from the current collector before and/or after being cut into pellets. Finally, the presence of cracks and/or of clusters revealing the heterogeneity of the electrode was also taken into consideration to evaluate the quality of adhesion of the $LiFePO_4$ electrode on the aluminium current collector.

The results have been set out in table (4) represented below in which the signs "++", "+" and "−" correspond to an order of magnitude enabling the observed characteristic to be quantified.

TABLE 4

| Mean molecular weight (g · mol$^{-1}$)/ electrode reference | Lift-off | Cracking | Flexibility | Presence of clusters |
|---|---|---|---|---|
| 250,000/C1-PAA/90-10 | + | ++ | − | ++ |
| 1,000,000/C2-PAA/90-10 | − | + | ++ | − |
| 1,250,000/E1-PAA/90-10 | − | − | ++ | − |
| 3,000,000/C3-PAA/90-10 | ++ | + | − | − |

"++": high; "+": mean; "−": little or none

PAA with a mean molecular weight of less than 1,250,000 g·mol$^{-1}$ are formed by polymer chains which are not sufficiently long to ensure a good cohesion, in the electrode, of the particles of active material such as LiFePO$_4$ with one another. Furthermore, PAA with a low mean molecular weight have a high concentration of carboxylic functions. The numerous carboxylic acid functions interact strongly with one another and with the material forming the current collector. These interactions cause the appearance of cracking after drying due to the increased rigidity of the electrode.

PAA with a mean molecular weight greater than 3,000,000 g·mol$^{-1}$ are formed by polymer chains that are sufficiently long to enable cohesion of the LiFePO$_4$ particles. The number of carboxylic functions in PAA with a high mean molecular weight is on the other hand not high enough to ensure a good adhesion of the electrode on the current collector. The concentration of carboxylic functions does in fact decrease proportionally to the mean molecular weight of the PAA. The interaction between the electrode and the current collector is consequently less strong. The risk of lift-off of the electrode from the current collector is greater.

The electrochemical performances of the E1-PAA/90-10 electrode were measured in a metallic lithium half-cell and compared with those of the electrode of Cai, Z. P et al. using a PAA of 1,000,000 g·mol$^{-1}$. Measurement of the electrochemical performances of the C3-PAA/90-10 electrode was not able to be performed on account of the poor mechanical strength of the electrode making the shaping of the latter impossible.

A metallic lithium electrode is used as negative electrode and reference electrode in the half-cell. The negative electrode is formed by the E1-PAA/90-10 electrode.

The grammage of the tested electrode E1-PAA/90-10 is 2.0±0.1 mAh·cm$^{-2}$.

The half-cell is fitted with a Celgard 2400 macroporous polymer separator marketed by the Celgard corporation and an LP10 electrolyte marketed by the Novolyte corporation. The LP10 electrolyte is a solution of lithium hexafluorophosphate (LiPF$_6$) with a concentration of 1 mol*L$^{-1}$ in a mixture of ethylene carbonate (EC), propylene carbonate (PC) and dimethyl carbonate (DMC). The EC/PC/DMC proportions are 1:1:3 in volume, and 2% in weight of vinylene carbonate (VC) was also added to the EC/PC/DMC mixture.

The half-cell formed in this way is subjected to a charge and discharge protocol A enabling the performances of the battery to be evaluated for an energy operating mode. The cyclic stability of the electrode is consequently tested during several charge and discharge cycles. The endurance of the storage battery is thus estimated. What is meant by endurance is the cyclability or the lifetime of the electrode.

Protocol A: Energy Operating Mode

Protocol A applied to the half-cell described above comprises the following successive steps:
  5 charge and discharge cycles at C120-D/20,
  995 charge and discharge cycles at C/10-D/10 rate.

Figure 2:
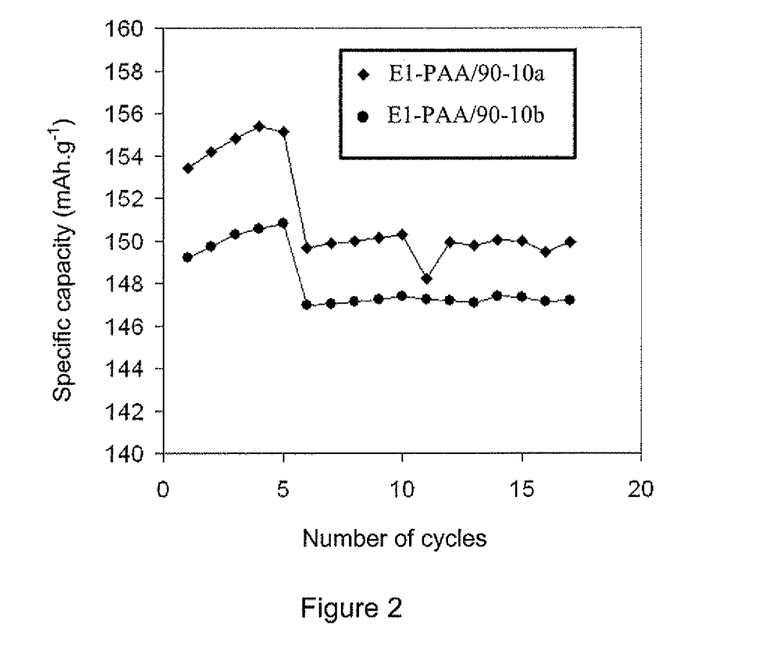
FIG. 2 represents, on the same graph, two plots of the progression of the specific capacity versus the number of cycles of two Li metal/electrode half-cells corresponding to an electrode according to a particular embodiment of the invention.

As represented in FIG. 2, two button cells, E1-PAA/90-10a and E1-PAA/90-10b, were produced under the same conditions and tested in order to consolidate the results. The specific capacity of the electrodes, E1-PAA/90-10a and E1-PAA/90-10b, respectively attains 149 mAh·g$^{-1}$ and 147 mAh·g$^{-1}$. The electrochemical performances of the E1-PAA/90-10 electrode are better than those of the electrode described by Cai et al. the specific capacity of which only attains 135 mAh·g$^{-1}$.

It is surprisingly observed that the choice of mean molecular weight of the PAA of the electrode has an effect on the strength of the electrode and also on the performances of the storage battery containing such an electrode.

According to a second particular embodiment, an electrode comprises an electrochemically active material, the PAA binder and an electronic conductor.

The PAA is chosen from PAA having a mean molecular weight greater than or equal to 1,250,000 g·mol$^{-1}$ and less than 3,000,000 g·mol$^{-1}$.

In particular, the percentage of electrochemically active material is greater than 90% by weight and the percentage of PAA is less than or equal to 4% by weight, the percentages being calculated with respect to the total weight of the electrode.

The electrode preferably comprises more than 94% by weight of electro-chemically active material and less than 3% by weight of PAA.

The weight percentage of electrochemically active material is preferably greater than 94% and the weight percentage of polyacrylic acid is less than or equal to 3%, said percentages being calculated with respect to the total weight of the electrode.

The electrode advantageously comprises less than 3% of electronic conductor.

The electronic conductor can contain one or more electronic conducting materials. The electronic conductor is preferably chosen from carbon black, carbon fibers and a mixture of the latter.

For example purposes, electrodes were prepared from LiFePO$_4$ and from a polyacrylic acid having a mean molecular weight equal to 1,250,000 g·mol$^{-1}$ according to the fabrication method described in the following.

A powdery mixture is obtained from LiFePO$_4$, carbon black and carbon fibers. The carbon black and the carbon fibers of Vgcf type (Vapor grown carbon nanofiber) used are products respectively marketed by the Timcal corporation under the brand name Super Plus (SP) and by the Showa Denko corporation under the brand name VgcF H.

After homogenization of the powders, the PAA dissolved at 5% by weight in distilled water is added to the powdery mixture. This mixture is then mixed with a spatula by means of any known method. Ultrasonic treatment for a few minutes is advisable to eliminate any aggregates that may have formed. Then the ink is mixed by a mixer of DISPERMAT type during 10 to 30 minutes. The mixing speed is for example comprised between 4000 rpm$^{-1}$ and 6000 rpm$^{-1}$.

The ink is then deposited on an aluminium current collector by means of a conventional coating method to form an ink/collector assembly. Prior to the coating, the aluminium foil constituting the current collector may if required be thermally treated at 650° C. or by plasma treatment using conventional techniques in order to improve the adhesion of the electrode on the current collector. The texture of the ink can be modified by adjusting the quantity of distilled water added. The quality of the ink obtained enables to perform a coating with a high coating rate of about 11 cm·s$^{-1}$, suitable for an industrial application.

The ink/collector assembly is then dried in a circulating-air oven at a temperature of 60° C. during a time comprised between 1 H and 24 H. After cutting by means of any known method, electrode pellets ready to be assembled in a lithium storage battery are obtained.

The characteristics of the electrodes thus obtained according to the second particular embodiment and their mechanical properties, in particular their quality of adhesion and homogeneity, are set out in the following table (5):

TABLE 5

| Reference | | E2-PAA/ 94-4 | E3-PAA/ 94-4 | E4-PAA/ 94-4 | E5-PAA/ 94-4 | E6-PAA/ 95-3 |
|---|---|---|---|---|---|---|
| MA | | | | LiFePO$_4$ | | LiFePO$_4$ |
| % MA (% by weight) | | | | 94 | | 95 |
| Electronic conductor | SP (% by weight) | | | 1 | | 1 |
| | Vgcf (% by weight) | | | 1 | | 1 |
| % PAA (% by weight) | | | | 4 | | 3 |
| Wet coating thickness (μm) | | 650 | 550 | 500 | 300 | 500 | 400 | 300 |
| Grammage (mAh·cm$^{-2}$) | | 4.1 | 3.9 | 2.2 | 1.1 | 4 | 3.3 | 2.4 |
| Adhesion/homogeneity | | ++ | ++ | ++ | ++ | ++ | ++ | ++ |

"++" good;
"+" fair;
"−" poor

Three comparative examples were also made according to the second particular embodiment described in the foregoing with the exception of the fact that the PAA is replaced by a polymer binder that is soluble in water formed by a mixture of carboxymethyl cellulose (CMC) and nitrile rubber (NBR), marketed by the Aldrich or Fluka corporation for the CMC and Dow Chemicals for the rubbers (NBR, SBR etc.).

The characteristics of the comparative electrodes thus obtained according to the second particular embodiment and their mechanical properties, in particular their quality of adhesion and of homogeneity, are set out in the following table (6):

TABLE 6

| Reference | | C1-CMC/ NBR/90-6 | C2-CMC/ NBR/92-4 | C3-CMC/ NBR/94-2 |
|---|---|---|---|---|
| MA | | LiFePO$_4$ | LiFePO$_4$ | LiFePO$_4$ |
| % MA (% by weight) | | 90 | 92 | 94 |
| Electronic conductor | SP (% by weight) | 2 | 2 | 2 |
| | Vgcf (% by weight) | 2 | 2 | 2 |
| CMC/NBR (% by weight) | | 6 (3-3) | 4 (2-2) | 2 (1-1) |
| Thickness of wet coating (μm) | | 450 | 450 | 450 |
| Grammage (mAh·cm$^{-2}$) | | 3.2 | 3.9 | 2.8 |
| Adhesion/homogeneity | | + | + | + |

"++" good; "+" fair; "−" poor

All the electrodes containing PAA at 1,250,000 g·mol$^{-1}$ as binder, as for the first embodiment present an excellent adhesion to the current collector, without lift-off before and/or after cutting into pellets. The flexibility and homogeneity of the electrodes E2-PAA/94-4, E3-PAA/94-4, E4-PAA/94-4, E5-PAA/94-4 and E6-PAA/95-3 are also very good with an absence of cracks.

Formulation of the electrodes E2-PAA/94-4, E3-PAA/94-4, E4-PAA/94-4, E5-PAA/94-4 and E6-PAA/95-3 enables an electrode having a high grammage rate, advantageously greater than or equal to 4 mAh·cm$^{-2}$, to be obtained without affecting the adhesion and homogeneity properties of the electrode. Definition of the pattern of the electrode pellets formed after cutting is also very good whatever the grammage of the electrode.

Electrodes C1-CMC/NBR/90-6, C2-CMC/NBR/92-4 and C3-CMC/NBR/94-2 present problems of adhesion on the aluminium current collector after cutting into pellets and tend to lift off from the current collector. In comparison with electrodes E2-PAA/94-4, E3-PAA/94-4, E4-PAA/94-4, E5-PAA/94-4 and E6-PAA/95-3, electrodes C1-CMC/NBR/90-6, C2-CMC/NBR/92-4 and C3-CMC/NBR/94-2 are also much less homogeneous with the appearance of some cracks.

The electrochemical performances of the pellets of electrode E4-PAA/94-4 and of the three comparative electrodes C1-CMC/NBR/90-6, C2-CMC/NBR/92-4 and C3-CMC/NBR/94-2 were evaluated and compared in a Li metal/electrode half-cell to be tested, according to protocol A described above.

Figure 3:
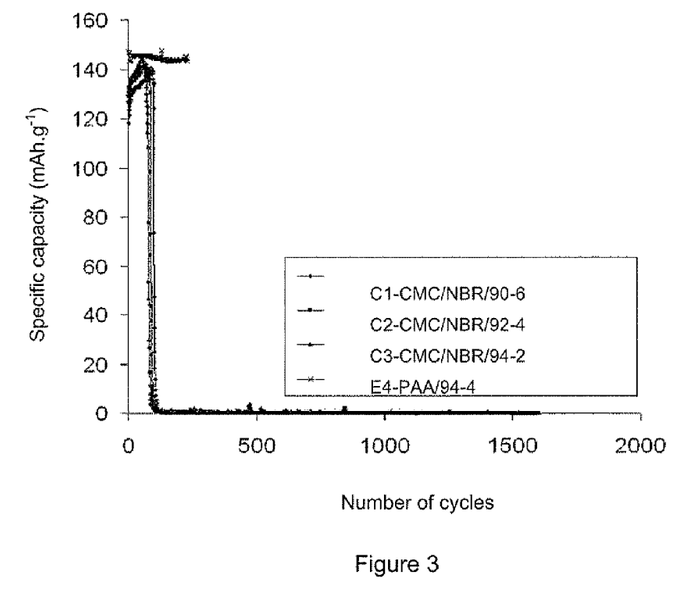
FIG. 3 represents, on the same graph, four plots of the progression of the specific capacity versus the number of cycles of four Li metal/electrode half-cells corresponding to an electrode according to a particular embodiment of the invention and to three comparative examples.

As represented in FIG. 3, the performances of the electrode E4-PAA/94-4 are considerably superior to those of electrodes C1-CMC/NBR/90-6, C2-CMC/NBR/92-4 and C3-CMC/NBR/94-2 with a specific capacity of about 149 mAh·g$^{-1}$ for electrode E4-PAA/94-4 containing the PAA binder at 1,250,000 g·mol$^{-1}$ against about 140 mAh·g$^{-1}$ for electrode CMC/NBR/90-6 displaying the best results of the three comparative electrodes containing the CMC/NBR binder.

Furthermore, a sharp drop of the specific capacity is observed for the three comparative electrodes C1-CMC/NBR/90-6, C2-CMC/NBR/92-4 and C3-CMC/NBR/94-2 after about one hundred cycles resulting in the stoppage of the operation of the half-cell. This sudden stoppage expresses the existence of a parasite reaction, which inactivates the half-cell in the case of a CMC/NBR binder.

Lithium storage batteries using an electrode with a PAA binder as described in the foregoing are stable and have a much longer lifetime than that of storage batteries comprising an electrode with the CMC/NBR binder.

Alternatively, the invention relates to the use of PAA as electrode binder in combination with another polymer soluble in water, taken for example from carboxymethyl cellulose or latex emulsions such as NBR and SBR rubbers. The PAA is always in a majority or equal quantity with respect to the other polymer. The tests performed are set out in the following tables 7, 8 and 9:

TABLE 7

| | F1 | weight (g) | weighed weight (g) | quantity of water | polymer % by weight | binders ratio |
|---|---|---|---|---|---|---|
| Active material | 92 | 6.44 | 6.44 | 0 | 0 | |
| SP | 2 | 0.14 | 0.14 | 0 | 0 | |
| Vgcf (fibers) | 2 | 0.14 | 0.14 | 0 | 0 | |
| CMC | 2 | 0.14 | 7 | 6.86 | 2 | 50% |
| NBR | 0 | 0 | 0 | 0 | 41 | 0% |
| PAA | 2 | 0.14 | 4 | 3.86 | 3.5 | 50% |

TABLE 8

| F2 | weight (g) | weighed weight (g) | quantity of water | polymer % by weight | binders ratio |
|---|---|---|---|---|---|
| Active material | 92 | 6.44 | 6.44 | 0 | 0 | |
| SP | 2 | 0.14 | 0.14 | 0 | 0 | |
| Vgcf (fibers) | 2 | 0.14 | 0.14 | 0 | 0 | |
| CMC | 1 | 0.07 | 3.5 | 3.43 | 2 | 25% |
| NBR | 0 | 0 | 0 | 0 | 41 | 0% |
| PAA | 3 | 0.21 | 6 | 5.79 | 3.5 | 75% |

TABLE 9

| F5 | weight (g) | weighed weight (g) | quantity of water | polymer % by weight | binders ratio |
|---|---|---|---|---|---|
| Active material | 92 | 6.44 | 6.44 | 0 | 0 | |
| SP | 2 | 0.14 | 0.14 | 0 | 0 | |
| Vgcf (fibers) | 2 | 0.14 | 0.14 | 0 | 0 | |
| CMC | 0 | 0 | 0 | 0 | 2 | 0% |
| NBR | 2 | 0.14 | 0.341 | 0.201 | 41 | 50% |
| PAA | 2 | 0.14 | 4 | 3.86 | 3.5 | 50% |

Each time, electrodes with very good adhesion and flexibility are obtained. No cracking was observed.

According to a third particular embodiment, the electrodes E4-PAA/94-4 and E5-PAA/94-4 are subjected to a compression step at different tonnages for 30 seconds, after the step of cutting into pellets. Pellets of electrode E4-PAA/94-4 and E5-PAA/94-4 having different porosities are obtained.

The porosities are calculated or measured by means of a BET or mercury porosity type technique and set out in the following table (10).

TABLE 10

| Reference | Pressure applied (Tonnes) | Porosity obtained (%) |
|---|---|---|
| E4-PAA/94-4/0 | 0 | 61 |
| E4-PAA/94-4/2 | 2 | 50 |
| E4-PAA/94-4/4 | 4 | 39 |
| E4-PAA/94-4/8 | 8 | 30 |
| E4-PAA/94-4/10 | 10 | 25 |
| E5-PAA/94-4/0 | 0 | 55 |
| E5-PAA/94-4/2 | 2 | 45 |
| E5-PAA/94-4/4 | 4 | 37 |

Protocol A: Energy Operating Mode

The electrodes E4-PAA/94-4/0, E4-PAA/94-4/2, E4-PAA/94-4/4, E4-PAA/94-4/8 and E4-PAA/94-4/10, which have a grammage of 2.8 mAh·cm$^{-2}$, were tested in a Li metal/E4-PAA/94-4 half-cell using the same protocol A as for the first embodiment described in the foregoing. Protocol A enables the electrochemical performances of an electrode in a lithium storage battery having an energy operating mode to be evaluated.

Figure 4:
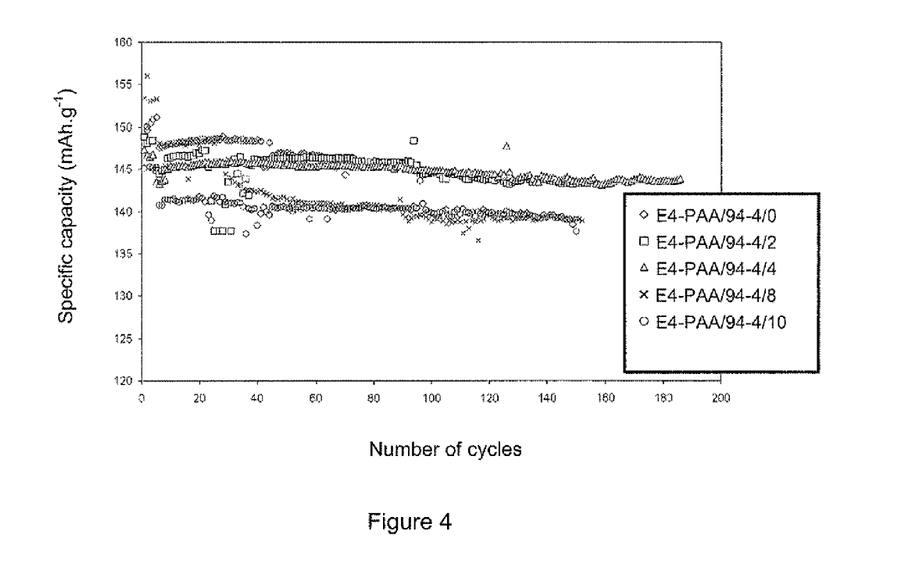
FIG. 4 represents, on the same graph, five plots of the progression of the specific capacity versus the number of cycles of five Li metal/electrode half-cells of different porosity, according to a particular embodiment of the invention.

As represented in FIG. 4, all the electrodes containing the PAA binder at 1,250,000 g·mol$^{-1}$ present a good cyclic stability whatever the porosity of the tested electrode and a specific capacity greater than or equal to 140 mAh·g$^{-1}$.

It can also be noted that although the electrode E4-PAA/94-4/0 has not been subjected to compression after drying, it does nevertheless enable the theoretic capacity of LiFePO4 of about 150 mAh·g$^{-1}$ to be restored at C/10 rate. It can further be observed that the loss of specific capacity per cycle remains low, in the order of 0.039 mAh·g$^{-1}$ per cycle.

The results show good endurance performances on charge and discharge. Furthermore, the compression step of the electrode after the drying of the electrode pellets described above can advantageously be eliminated from the fabrication method of the electrode. The results obtained above do in fact show that this compression or calendering step is not an essential step in the fabrication method for obtaining a high specific capacity.

Protocol B: Power Operating Mode

The electrodes E5-PAA/94-4/0, E5-PAA/94-4/2 and E5-PAA/94-4/4, which have a low grammage of 1.1 mAh·cm$^{-2}$, were tested in a Li metal/E5-PAA/94-4 half-cell using a protocol B designed to evaluate the capacity of the half-cell to withstand high charge and discharge rates, for example current pulses. Protocol B enables the electrochemical performances of an electrode in a lithium battery having a power operating mode to be evaluated.

Protocol B is composed of the following successive steps:
2 charge and discharge cycles at C/20-D/20 for the formation step,
5 charge and discharge cycles at C/20-D/20,
5 charge and discharge cycles at C/10-D/10,
5 charge and discharge cycles at C/5-D/5,
5 charge and discharge cycles at C/2-D/2,
5 charge and discharge cycles at C-D,
5 charge and discharge cycles at 2C-2D and,
5 charge and discharge cycles at 10C-10D.

The results obtained are set out in the following table (11):

TABLE 11

| | Mean Specific Capacity (mAh · g$^{-1}$) | | |
|---|---|---|---|
| | E5-PAA/94-4/0 | E5-PAA/94-4/2 | E5-PAA/94-4/4 |
| D/20 | 139.1 | 151.4 | 169.8 |
| D/10 | 137.2 | 151.3 | 153.3 |
| D/5 | 130.2 | 143.9 | 137.5 |
| D/2 | 91 | 132.9 | 133.2 |
| D | 86.5 | 123.3 | 120.7 |
| 2D | 2.4 | 110.7 | 108.1 |
| 10D | — | 52.4 | 57.4 |

Although the formulation of the tested electrodes corresponds to a formulation of energy electrodes, i.e. comprising a high weight percentage of electrochemically active material and a low weight percentage of binder, the results show that the three electrodes E5-PAA/94-410, E5-PAA/94-4/2 and E5-PAA/94-4/4 nevertheless remain efficient for power applications.

The three electrodes can advantageously be used indifferently in a lithium storage battery having a power or an energy operating mode.

The electrode described above is particularly efficient in a Lithium-Ion storage battery.

In spite of the absence of a compression step in the fabrication method of the electrode, the electrode E5-PAA/94-4/0 gives sufficiently good results to envisage a power or energy application.

Electrochemical Stability Test

Electrochemical tests were carried out in cyclic voltammetry on an aqueous solution containing 3.5% by weight of polyacrylic acid having a mean molecular weight of 1,250,000 g·mol$^{-1}$. The range of potentials used is comprised between 2.1V and 6.5V and the scanning rate is equal to 5 mV·s$^{-1}$.

A conventional cyclic voltammetry set-up was made with a work electrode and a counter-electrode made from platinum and a saturated calomel reference electrode. The potentials were then recalculated with respect to a Li/Li+ reference.

Figure 5:
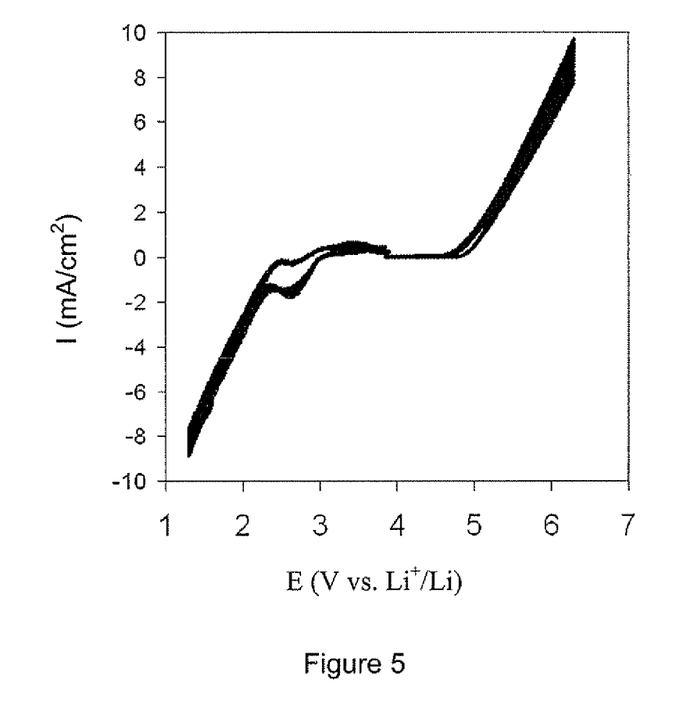
FIG. 5 represents a cyclic voltammetry curve made on an aqueous solution of polyacrylic acid between a potential of 1V and 6.5V vs. Li$^+$/Li.

As illustrated in FIG. 5, PAA is very stable from the electrochemical point of view. With the exception of a totally reversible oxydo-reduction reaction which occurs around 2.4 V, no degradation of the polymer is observed in either reduction or oxidation over all the potentials covering the range [1,2; 6,5] V vs Li/Li+. It is further observed that the current densities are also very low, in particular less than $10\ \mu A \cdot cm^{-1}$.

The very large stability window of PAA enables PAA to be used as binder of numerous electrochemically active materials. PAA can for example be used with graphite carbon, $Li_4Ti_5O_{12}$ and, also with high-potential spinel materials such as $LiNi_{0.5}Mn_{1.5}O_4$.

The choice of a PAA as binder having a mean molecular weight greater than or equal to 1,250,000 g·mol$^{-1}$ and less than 3,000,000 g·mol$^{-1}$, combined with selection of a percentage of electrochemically active material greater than or equal to 90% enables an electrode with improved electrochemical performances and a better mechanical strength to be obtained.

In particular, unlike electrodes of the prior art, the electrode according to the invention presents a good homogeneity and a mechanical strength enabling the electrode to be easily printed whatever the shape of the pattern, even for high electrode grammages, without the occurrence of fissures or cracks, or lift-off of the electrode from the current collector.

The electrode according to the invention further has a particular latticed structure enabling an improved electric percolation and a better cohesion. This structure can advantageously compensate the absence of compression or calendering in the fabrication method of the electrode.

Lithium storage batteries comprising at least one electrode as described above present a high specific capacity able to respond to high charge and discharge rates.

The electrode according to the invention is remarkable in that it can advantageously be used both in a lithium storage battery having a power operating mode and an energy operating mode power. The electrode according to the invention is particularly interesting for an industrial application in terms of cost and production yield.

The invention claimed is:

1. An electrode for a lithium battery comprising $LiFePO_4$ as electrochemically active material and a binder consisting of polyacrylic acid,
    wherein the polyacrylic acid has a mean molecular weight of about 1,250,000 g·mol$^{-1}$; and
    wherein the $LiFePO_4$ has a weight percentage of greater than 90% and the polyacrylic acid has a weight percentage of less than or equal to 4%, said weight percentages being calculated with respect to the total weight of the electrode.

2. The electrode according to claim 1, wherein the mean molecular weight of the polyacrylic acid is equal to 1,250,000 g·mol$^{-1}$.

3. The electrode according to claim 1, wherein the electrode has a grammage rate greater than or equal to 4 mAh·cm$^{-2}$.

4. The electrode according to claim 1, wherein the weight percentage of $LiFePO_4$ is greater than 94% and the weight percentage of polyacrylic acid is less than or equal to 3%, said weight percentages being calculated with respect to the total weight of the electrode.

5. The electrode according to claim 4, wherein the weight percentage of polyacrylic acid with respect to the total weight of the electrode is less than 3%.

6. The electrode according to claim 1, wherein the electrode comprises an electronic conductor.

7. The electrode according to claim 6, wherein the electronic conductor is chosen from carbon black, carbon fibers and a mixture of carbon black and carbon fibers.

8. The electrode according to claim 6, wherein the electrode comprises less than 3% of electronic conductor.

9. A lithium storage battery having a power or energy operating mode, the lithium storage battery comprising an electrode comprising $LiFePO_4$ as electrochemically active material and a binder consisting of polyacrylic acid,
    wherein the polyacrylic acid has a mean molecular weight of about 1,250,000 g·mol$^{-1}$, wherein the $LiFePO_4$ has a weight percentage of greater than 90% and the polyacrylic acid has a weight percentage of less than or equal to 4%, said weight percentages being calculated with respect to the total weight of the electrode.

10. The lithium storage battery according to claim 9, wherein the lithium storage battery is a lithium ion battery.

* * * * *